US009463436B2

(12) United States Patent
Furudate et al.

(10) Patent No.: US 9,463,436 B2
(45) Date of Patent: Oct. 11, 2016

(54) METHOD FOR MANUFACTURING MICROPARTICULATE ANATASE OR RUTILE TITANIUM OXIDE DISPERSION AND COMPONENT HAVING PHOTOCATALYTIC THIN FILM ON SURFACE (75) Inventors: Manabu Furudate, Kamisu (JP); Tomohiro Inoue, Kamisu (JP); Shiro Takahashi, Kamisu (JP); Yoshitsugu Eguchi, Kamisu (JP); Tadashi Amano, Kamisu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/115,209

(22) PCT Filed: May 10, 2012

(86) PCT No.: PCT/JP2012/061999
§ 371 (c)(1),
(2), (4) Date: Nov. 1, 2013

(87) PCT Pub. No.: WO2012/160986
PCT Pub. Date: Nov. 29, 2012

(65) Prior Publication Data
US 2014/0100105 A1    Apr. 10, 2014

(30) Foreign Application Priority Data

| May 24, 2011 | (JP) | 2011-115692 |
| May 24, 2011 | (JP) | 2011-115695 |
| Nov. 21, 2011 | (JP) | 2011-253773 |
| Nov. 21, 2011 | (JP) | 2011-253789 |
| Mar. 6, 2012 | (JP) | 2012-048699 |
| Mar. 6, 2012 | (JP) | 2012-048707 |

(51) Int. Cl.
*B01J 21/08* (2006.01)
*B01J 37/03* (2006.01)
(Continued)

(52) U.S. Cl.
CPC ............. *B01J 21/08* (2013.01); *B01J 21/063* (2013.01); *B01J 23/14* (2013.01); *B01J 35/004* (2013.01);
(Continued)

(58) Field of Classification Search
CPC .. C01G 23/04; C01G 23/047; C01G 23/053; B01J 21/06
USPC .......................... 423/610, 611, 612; 502/350
See application file for complete search history.

(56) References Cited

U.S. PATENT DOCUMENTS

| 2001/0056164 A1* | 12/2001 | Duncum ................ C09K 8/524 526/319 |
| 2005/0013766 A1* | 1/2005 | Imura et al. .................. 423/610 |

(Continued)

FOREIGN PATENT DOCUMENTS

| AU | 2004203522 A1 | 2/2005 |
| JP | 64-3020 A | 1/1989 |

(Continued)

OTHER PUBLICATIONS

International Search Report issued in PCT/JP2012/061999 mailed Aug. 14, 2012.
(Continued)

*Primary Examiner* — Matthew E Hoban
*Assistant Examiner* — James Fiorito
(74) *Attorney, Agent, or Firm* — Birch, Stewart, Kolasch & Birch, LLP (57) ABSTRACT A method for manufacturing a microparticulate anatase or rutile titanium oxide dispersion from a peroxotitanic acid solution optionally containing tin, wherein the method for manufacturing an anatase or rutile titanium oxide dispersion is characterized in that the peroxotitanic acid solution is fed continuously to a flow reactor and subjected to hydrothermal treatment at 150 to 250° C. and 0.5 to 10 MPa. The invention makes it possible to provide a method for manufacturing a microparticulate anatase or rutile titanium oxide dispersion having excellent stability in regard to the titanium oxide microparticles and enabling a high-transparency photocatalytic thin film to be produced, and to provide a member having a photocatalytic thin film formed on the surface using this dispersion.

19 Claims, 1 Drawing Sheet (51) Int. Cl.
*B01J 37/08* (2006.01)
*B01J 23/14* (2006.01)
*B01J 35/00* (2006.01)
*C09D 1/00* (2006.01)
*C09D 5/16* (2006.01)
*B01J 21/06* (2006.01)
*C01G 23/047* (2006.01)
*C01G 23/04* (2006.01)
*C01G 23/053* (2006.01)
*B01J 35/02* (2006.01)
*C08K 3/22* (2006.01)

(52) U.S. Cl.
CPC .............. *B01J 37/031* (2013.01); *B01J 37/08* (2013.01); *C09D 1/00* (2013.01); *C09D 5/1618* (2013.01); *B01J 21/06* (2013.01); *B01J 35/023* (2013.01); *B01J 37/035* (2013.01); *C01G 23/04* (2013.01); *C01G 23/047* (2013.01); *C01G 23/053* (2013.01); *C08K 2003/2241* (2013.01)

(56) References Cited

U.S. PATENT DOCUMENTS

2006/0144793 A1* 7/2006 Dadachov .................... 210/660
2010/0226851 A1   9/2010 Kim et al.

FOREIGN PATENT DOCUMENTS

| JP | 1-78928 U | 5/1989 |
| JP | 1-139139 A | 5/1989 |
| JP | 6-279725 A | 10/1994 |
| JP | 7-247119 A | 9/1995 |
| JP | 10-67516 A | 3/1998 |
| JP | 2004-337740 A | 12/2004 |
| JP | 2005-68001 A | 3/2005 |
| JP | 2005-254128 A | 9/2005 |
| JP | 2005-321028 A | 11/2005 |
| JP | 2006-321993 A | 11/2006 |
| JP | 2009-227519 A | 10/2009 |
| JP | 2010-504272 A | 2/2010 |
| JP | 2010-143193 A | 7/2010 |
| JP | 2010-269963 A | 12/2010 |
| JP | 2011-63977 A | 3/2011 |

OTHER PUBLICATIONS

Written Opinion of the International Searching Authority issued in PCT/JP2012/061999 mailed Aug. 14, 2012.
The Office Action, dated Feb. 3, 2015, issued in the corresponding Japanese Patent Application No. 2012-048699.
The Office Action, dated Feb. 3, 2015, issued in the corresponding Japanese Patent Application No. 2012-048707.

* cited by examiner

METHOD FOR MANUFACTURING MICROPARTICULATE ANATASE OR RUTILE TITANIUM OXIDE DISPERSION AND COMPONENT HAVING PHOTOCATALYTIC THIN FILM ON SURFACE

TECHNICAL FIELD

This invention relates to a method for manufacturing an anatase or rutile form titanium oxide ultrafine particle dispersion and a member having on its surface a photocatalytic thin film formed using the dispersion; and more particularly, to a method for manufacturing an anatase or rutile form titanium oxide ultrafine particle dispersion from which a photocatalytic thin film is readily formed, and a member having on its surface a photocatalytic thin film formed using the dispersion.

BACKGROUND ART

Titanium oxide is used in a variety of applications, for example, pigments, UV screeners, catalysts, photocatalysts, catalyst supports, adsorbents, ion-exchangers, fillers, reinforcements, ceramic-forming raw materials, precursors to complex oxides such as perovskite complex oxide, and magnetic tape primers.

Among others, photocatalytic titanium oxide fine particles are often used in such applications as substrate surface cleaning, deodorizing and antifungal treatment because a photocatalytic coating film which is formed by coating a dispersion of titanium oxide fine particles onto the surface of various substrates serves to decompose organic matters and renders the film surface hydrophilic due to the photocatalytic action of titanium oxide. However, the contact area of photocatalytic particles with a substance to be decomposed must be increased before the photocatalytic activity can be enhanced. To this end, the particles are required to have a primary particle size of up to 50 nm. Also the film is required to be transparent to avoid any impact on the substrate design.

Dispersions of titanium oxide fine particles are generally prepared, for example, by a method of synthesizing titanium oxide fine particles by the vapor phase or liquid phase process and dispersing the particles in a dispersing medium with a dispersant such as an organic polymeric dispersant on a wet dispersing machine (see JP-A H01-003020, JP-A H06-279725), JP-A H07-247119). However, these methods have the problem that since ultrafine particles with an average particle size of up to 50 nm are prone to agglomerate together, a great amount of labor is necessary until dispersion to primary particles, and in some cases, dispersion to primary particles is impossible.

It is also disclosed that an anatase titanium oxide dispersion having long-term stability is prepared by dissolving titanium hydroxide with hydrogen peroxide to form a peroxotitanic acid solution and subjecting it to hydrothermal treatment (JP-A H10-67516); and that a rutile titanium oxide dispersion is prepared by hydrothermal treatment of peroxotitanic acid solution in the co-presence of a tin compound (JP-A H01-78928). These methods have the problem that hydrothermal treatment requires a relatively long reaction time of 40 to 2 hours at 85 to 200° C., for example. Besides, a high efficiency preparation method has not been established because of batchwise reaction.

SUMMARY OF INVENTION

Technical Problem

While the invention has been made under the above-discussed circumstances, its object is to provide a method for continuously and briefly manufacturing an anatase or rutile titanium oxide ultrafine particle dispersion which is improved in dispersion stability of titanium oxide ultrafine particles and from which a highly transparent photocatalytic thin film can be readily formed; and a member having on its surface a photocatalytic thin film formed using the dispersion.

Solution to Problem

Making extensive investigations to attain the above object, the inventors have found that an anatase or rutile titanium oxide ultrafine particle dispersion can be continuously prepared in a short time by hydrothermal reaction of peroxotitanic acid solution in a flow reactor; that the titanium oxide ultrafine particle dispersion is improved in dispersion stability of titanium oxide ultrafine particles; and that a highly transparent photocatalytic thin film can be readily formed from the titanium oxide ultrafine particle dispersion. The invention is predicated on this finding.

Accordingly, the invention provides a method for manufacturing an anatase or rutile titanium oxide ultrafine particle dispersion and a member having on its surface a photocatalytic thin film formed using the dispersion, as defined below.

[1] A method for manufacturing an anatase titanium oxide ultrafine particle dispersion from a peroxotitanic acid solution, comprising the steps of continuously feeding a peroxotitanic acid solution to a flow reactor and subjecting it to hydrothermal treatment at 150 to 250° C. and 0.5 to 10 MPa.

[2] The method of [1] wherein the titanium oxide ultrafine particles in the anatase titanium oxide ultrafine particle dispersion have a 50% particle diameter ($D_{50}$) in the cumulative distribution on volume basis of up to 50 nm as measured by the dynamic scattering method using laser light.

[3] The method of [1] or [2] wherein the peroxotitanic acid solution continuously fed to the flow reactor is heated to the predetermined hydrothermal reaction temperature within 2 minutes.

[4] The method of any one of [1] to [3] wherein the titanium oxide ultrafine particle dispersion obtained from hydrothermal treatment of the peroxotitanic acid solution is subsequently cooled to or below 40° C. within 2 minutes.

[5] The method of any one of [1] to [4] wherein a reaction time in the flow reactor is adjusted such that the peroxotitanic acid solution may be converted to the titanium oxide ultrafine particle dispersion at a conversion rate of 95 to 99.5%.

[6] The method of any one of [1] to [5] wherein a binder is further added to the resulting anatase titanium oxide ultrafine particle dispersion.

[7] The method of [6] wherein the binder is a silicon compound binder.

[8] A member having on its surface a photocatalytic thin film which is formed using the anatase titanium oxide ultrafine particle dispersion obtained by the method of any one of [1] to [7].

[9] A method for manufacturing a rutile titanium oxide ultrafine particle dispersion from a tin-containing peroxotitanic acid solution, comprising the steps of continuously feeding a tin-containing peroxotitanic acid solution to a flow reactor and subjecting it to hydrothermal treatment at 150 to 250° C. and 0.5 to 10 MPa.

[10] The method of [9] wherein tin is contained in such an amount that a molar ratio (Ti/Sn) of titanium oxide to tin may be from 1 to 1,000.

[11] The method of [9] or [10] wherein the titanium oxide ultrafine particles in the rutile titanium oxide ultrafine particle dispersion have a 50% particle diameter ($D_{50}$) in the cumulative distribution on volume basis of up to 50 nm as measured by the dynamic scattering method using laser light.

[12] The method of any one of [9] to [11] wherein the peroxotitanic acid solution continuously fed to the flow reactor is heated to the predetermined hydrothermal reaction temperature within 2 minutes.

[13] The method of any one of [9] to [12] wherein the titanium oxide ultrafine particle dispersion obtained from hydrothermal treatment of the peroxotitanic acid solution is subsequently cooled to or below 40° C. within 2 minutes.

[14] The method of any one of [9] to [13] wherein a reaction time in the flow reactor is adjusted such that the peroxotitanic acid solution may be converted to the titanium oxide ultrafine particle dispersion at a conversion rate of 95 to 99.5%.

[15] The method of any one of [9] to [14] wherein a binder is further added to the rutile titanium oxide ultrafine particle dispersion.

[16] The method of [15] wherein the binder is a silicon compound binder.

[17] A member having on its surface a photocatalytic thin film which is formed using the rutile titanium oxide ultrafine particle dispersion obtained by the method of any one of [9] to [16].

Advantageous Effects of Invention

According to the method of the invention, an anatase or rutile titanium oxide ultrafine particle dispersion is manufactured which is improved in dispersion stability of titanium oxide ultrafine particles and from which a highly transparent photocatalytic thin film can be readily formed. A member having on its surface a photocatalytic thin film formed using the dispersion is also available.

DESCRIPTION OF EMBODIMENTS

Now the invention is described in further detail.
[Method for Manufacturing Anatase or Rutile Titanium Oxide Ultrafine Particle Dispersion]

The method for manufacturing an anatase form titanium oxide ultrafine particle dispersion according to the invention is by hydrothermal reaction of a tin-free peroxotitanic acid solution in a flow reactor.

The method for manufacturing a rutile form titanium oxide ultrafine particle dispersion according to the invention is by hydrothermal reaction of a tin-containing peroxotitanic acid solution in a flow reactor.

Tin-Free Peroxotitanic Acid Solution

As the tin-free peroxotitanic acid solution, use may be made of either a commercially available product (for example, trade name "PTA-85" by Kon Corp.) or a peroxotitanic acid solution which is prepared by reacting a raw titanium compound with a basic substance and hydrogen peroxide in an aqueous dispersing medium.

The reaction procedure may be by adding a basic substance to a raw titanium compound in an aqueous dispersing medium to form titanium hydroxide, removing impurity ions, and adding hydrogen peroxide thereto, thereby yielding a peroxotitanic acid solution.

Tin-Containing Peroxotitanic Acid Solution

A tin-containing peroxotitanic acid solution which is prepared by reacting a raw titanium compound, tin compound, basic substance and hydrogen peroxide in an aqueous dispersing medium may be used.

The reaction procedure may be by adding a basic substance to a mixture of a raw titanium compound and tin compound in an aqueous dispersing medium to form a mixture of tin-containing titanium hydroxide, removing impurity ions, and adding hydrogen peroxide thereto, thereby yielding a tin-containing peroxotitanic acid solution.

Preferably the tin component is contained in such an amount that a molar ratio (Ti/Sn) of titanium to tin may range from 1 to 1,000, more preferably from 5 to 100, and even more preferably from 10 to 25. A molar ratio in excess of 1,000 may lead to an insufficient effect. On the other hand, if the molar ratio is less than 1, the proportion of titanium oxide is low, sometimes failing to exert a sufficient photocatalytic effect.

Understandably, on use of tin-free peroxotitanic acid solution, the resulting titanium oxide takes anatase form. On use of tin-containing peroxotitanic acid solution, the resulting titanium oxide takes rutile form.

Examples of the raw titanium compound include salts of titanium with mineral acids such as hydrochloric acid, nitric acid and sulfuric acid, salts of titanium with organic acids such as formic acid, citric acid, oxalic acid, lactic acid and glycolic acid, and titanium hydroxide obtained by adding alkalis to these aqueous solutions to induce hydrolysis for precipitation. These compounds may be used alone or in a combination of two or more.

Examples of the tin compound include salts of tin with mineral acids such as hydrochloric acid, nitric acid and sulfuric acid, salts of tin with organic acids such as formic acid, citric acid, oxalic acid, lactic acid and glycolic acid, and tin hydroxide obtained by adding alkalis to these aqueous solutions to induce hydrolysis for precipitation. These compounds may be used alone or in a combination of two or more.

The aqueous dispersing medium used herein serves to form an aqueous solution of the raw titanium compound or the raw titanium compound and tin compound while it may be an aqueous solvent. Examples of the aqueous solvent include water and a mixture of water and a hydrophilic organic solvent in an arbitrary ratio. Preferably water is deionized water, distilled water or pure water, for example. The hydrophilic organic solvent is preferably an alcohol such as methanol, ethanol or isopropanol. The hydrophilic organic solvent is preferably mixed in an amount of 0 to 50% by weight based on the aqueous dispersing medium. Among others, pure water is most preferred for productivity and cost.

The raw titanium compound aqueous solution formed from the raw titanium compound and aqueous dispersing medium as mentioned above, or the raw titanium compound aqueous solution formed from the raw titanium compound, tin compound and aqueous dispersing medium as mentioned above preferably has a concentration of up to 60% by weight, more preferably up to 30% by weight. While the lower limit of concentration may be selected as appropriate, it is preferably at least 1% by weight.

The basic substance serves to smoothly convert the raw titanium compound or tin-containing raw titanium compound to titanium hydroxide or tin-containing titanium hydroxide and to stabilize the peroxotitanic component (to be described later) in the aqueous dispersing medium. Examples include hydroxides of alkali metals or alkaline earth metals such as sodium hydroxide and potassium hydroxide, and amine compounds such as ammonia, alkanol amines and alkylamines. The basic substance is used in such an amount that the raw titanium compound aqueous solution may have at least pH 7, especially pH 7 to 10. The basic substance may be used as an aqueous solution of a suitable concentration in the above-mentioned aqueous dispersing medium.

Hydrogen peroxide serves to convert the raw titanium compound or titanium hydroxide to a peroxotitanate, that is, titanium oxide-based compound containing a Ti—O—O—Ti linkage. It is typically used in the form of aqueous hydrogen peroxide.

Hydrogen peroxide is preferably added in an amount of 1.5 to 5 moles per mole of Ti. For the reaction to convert the raw titanium compound or titanium hydroxide to peroxotitanic acid with hydrogen peroxide added, the temperature is preferably 5 to 60° C. and the time is preferably 30 minutes to 24 hours.

To the tin-free or tin-containing peroxotitanic acid solution thus obtained, an alkaline or acidic substance may be added for pH adjustment or the like.

Examples of the alkaline substance include ammonia, sodium hydroxide, calcium hydroxide, etc., and examples of the acidic substance include mineral acids such as sulfuric acid, nitric acid, hydrochloric acid, carbonic acid, phosphoric acid, and hydrogen peroxide, and organic acids such as formic acid, citric acid, oxalic acid, lactic acid, and glycolic acid.

In this regard, it is preferred for safe handling that the tin-free or tin-containing peroxotitanic acid solution be at pH 1 to 7, more preferably pH 4 to 7.

Flow Reactor

The flow reactor for hydrothermal treatment of the tin-free or tin-containing peroxotitanic acid solution includes a feedstock tank, high-pressure feed pump, heating section, cooling section, and collector section. The outline of the system is illustrated in FIG. 1.

Figure 1:
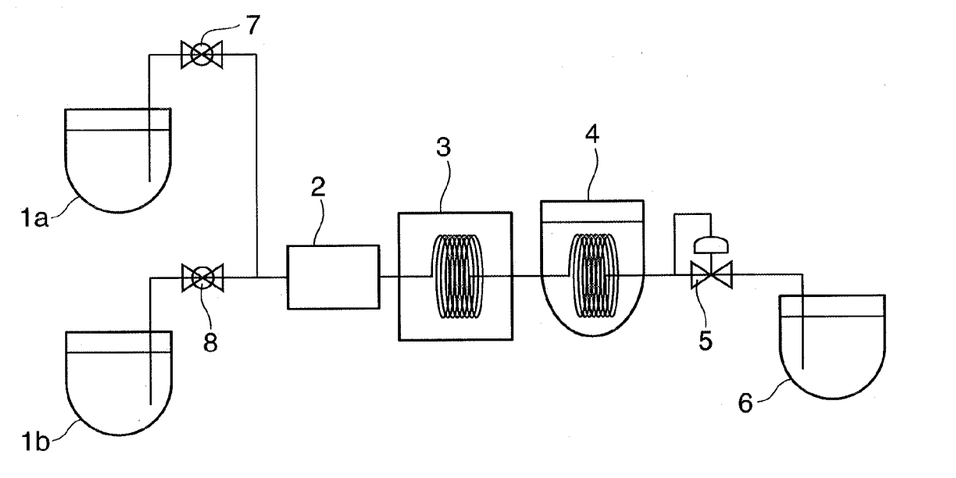
FIG. 1 is a schematic view of a system used in the practice of the invention.

Illustrated in FIG. 1 are a feedstock tank 1a for receiving an aqueous medium, a tank 1b for receiving a tin-free or tin-containing peroxotitanic acid solution, a feed pump 2 for supplying the aqueous medium in the feedstock tank 1a or the tin-free or tin-containing peroxotitanic acid solution in the feedstock tank 1b to a heating section 3, the heating section 3 for inducing hydrothermal reaction to the tin-free or tin-containing peroxotitanic acid solution to form a titanium oxide ultrafine particle dispersion, a cooling section 4 for cooling the titanium oxide ultrafine particle dispersion, a back-pressure valve 5, and a collector section 6 for collecting the resulting titanium oxide ultrafine particle dispersion. Also valves 7 and 8 are illustrated.

When an anatase or rutile titanium oxide ultrafine particle dispersion is prepared from a tin-free or tin-containing peroxotitanic acid solution using the flow reactor illustrated above, the aqueous medium, typically pure water, in the feedstock tank 1a is first supplied to the heating section by the feed pump 2. Once the aqueous medium is heated to a predetermined temperature of 150 to 250° C., the supply of the aqueous medium is interrupted, and the tin-free or tin-containing peroxotitanic acid solution is then supplied and subjected to hydrothermal reaction.

The feed pump 2 used herein is preferably a high-pressure feed pump. The means for flowing the tin-free or tin-containing peroxotitanic acid solution across the heating and cooling sections 3 and 4 are preferably tubes of metal material such as stainless steel, so that the tin-free or tin-containing peroxotitanic acid solution may flow through the bores thereof.

Below the outline of the system and hydrothermal reaction are described in detail. Although the embodiment described below uses a stainless steel tube as the tube for flowing the tin-free or tin-containing peroxotitanic acid solution, the tube is not limited thereto, and a tube of another metal may be used.

(1) High-Pressure Feed Pump

A feed pump is connected at a suction side to the tank 1a filled with the aqueous medium and the tank 1b filled with the tin-free or tin-containing peroxotitanic acid solution via the valves 7 and 8, respectively, and at a discharge side to a stainless steel tube extending to the heating section 3 and then to the cooling section 4. The pump used herein is preferably a high-pressure feed pump capable of pumping the raw material solution under high pressure.

(2) Heating Section

A coil of stainless steel tube is connected to the discharge side of the high-pressure feed pump so that the tin-free or tin-containing peroxotitanic acid (reactant) solution may flow through the tube. The tube is externally heated for effecting hydrothermal treatment of the reactant solution flowing through the bore. Via hydrothermal treatment, the reactant solution is converted into an anatase or rutile form titanium oxide ultrafine particle dispersion. To elevate the tube inner temperature to or above 150° C., the back-pressure valve 5 is disposed at the outlet of the cooling section so as to maintain the tube inner pressure at or above the saturated vapor pressure at the heating temperature. The external heating means is not particularly limited as long as the reactant solution in the tube can be heated to the selected temperature. For example, steam heating, an electric oven, oil bath, sand bath or the like may be used.

It is preferred from the standpoint of heat transfer to the fluid passing through the tube bore that the coiled stainless steel tube have an inner diameter of up to 20 mm, more preferably up to 10 mm, even more preferably up to 5 mm, and at least 1 mm, more preferably at least 2 mm.

From the standpoints of reaction efficiency and reaction control, the hydrothermal treatment temperature is typically in the range of 150 to 250° C., preferably 180 to 250° C.

To make it possible to heat the reactant solution to or above 150° C., the tube inner pressure is typically in the range of 0.5 to 10 MPa, preferably 2 to 10 MPa.

The reaction time is typically 0.5 to 20 minutes, preferably 1 to 10 minutes to control the conversion rate of the reactant.

From the standpoints of uniformity and particle size of formed titanium oxide ultrafine particles, the heating time up to the hydrothermal temperature is typically within 2 minutes, preferably within 1 minute. Notably, the reaction time defined above is a time passed after the hydrothermal temperature is reached on heating, and not inclusive of this heating time.

The back-pressure valve is not particularly limited as long as the tube inner pressure is maintained constant.

(3) Cooling Section

A coil of cooling stainless steel tube is connected to the outlet tube of the heating section and externally cooled so that the anatase or rutile titanium oxide dispersion flowing through the tube bore is cooled to stop the reaction. The external cooling means is not particularly limited as long as the anatase or rutile titanium oxide dispersion in the tube can be cooled to the selected temperature. For example, a water bath, ice bath or the like may be used.

It is preferred from the standpoint of heat transfer to the fluid passing through the tube bore that the cooling stainless steel tube have an inner diameter of up to 20 mm, more preferably up to 10 mm, even more preferably up to 5 mm, and at least 1 mm, more preferably at least 2 mm.

From the standpoint of quenching the reaction, the cooling temperature is typically in the range of up to 40° C., preferably up to 30° C. The lower limit of the cooling temperature is typically at least 0° C., though not critical.

From the standpoints of uniformity and particle size of formed titanium oxide, the time for cooling is typically within 3 minutes, preferably within 2 minutes.

(4) Collector Section

The anatase or rutile titanium oxide ultrafine particle dispersion from the outlet tube of the cooling section is collected by the collector tank.

A dispersion of anatase or rutile form titanium oxide ultrafine particles is obtained in this way. The titanium oxide ultrafine particles in the dispersion preferably have a 50% particle diameter (D50) in the cumulative distribution on volume basis of up to 50 nm, more preferably up to 20 nm, as measured by the dynamic scattering method using laser light, the 50% particle diameter (D50) being referred to as "average particle size," hereinafter. The lower limit of the average particle size is preferably at least 5 nm, though not critical.

The concentration of titanium oxide ultrafine particles in the dispersion is preferably 0.01 to 20% by weight, more preferably 0.5 to 10% by weight for ease of formation of a photocatalytic thin film of the predetermined thickness.

Further, the rate of conversion from peroxotitanic acid solution to titanium oxide ultrafine particle dispersion is typically 95 to 99.5%, more preferably 98 to 99.5%. If the conversion rate is less than 95%, a photocatalytic thin film obtained from the dispersion may have an insufficient photocatalytic effect. If the conversion rate exceeds 99.5%, titanium oxide ultrafine particles in the dispersion may be prone to agglomerate together.

[Member having Photocatalytic Thin Film on Surface]

The anatase or rutile titanium oxide ultrafine particle dispersion thus obtained may be used to form a photocatalytic thin film on the surface of various members.

The various members are not particularly limited. The materials of members include organic materials and inorganic materials, for example. The inorganic materials include, for example, nonmetallic inorganic materials and metal inorganic materials. These materials may have any of different shapes depending on the intended purpose and application.

Suitable organic materials include, for example, synthetic resin materials such as vinyl chloride resin (PVC), polyethylene (PE), polypropylene (PP), polycarbonate (PC), acrylic resins, polyacetal, fluoro-resins, silicone resins, ethylene-vinyl acetate copolymers (EVA), acrylonitrile-butadiene rubber (NBR), polyethylene terephthalate (PET), polyethylene naphthalate (PEN), polyvinyl butyral (PVB), ethylene-vinyl alcohol copolymers (EVOH), polyimide resins, polyphenylene sulfide (PPS), polyether imide (PEI), polyether ether imide (PEEI), polyether ether ketone (PEEK), melamine resins, phenolic resins, and acrylonitrile-butadiene-styrene (ABS) resins; natural materials such as natural rubber; or semi-synthetic materials between the synthetic resin materials and natural materials.

These materials may be formed into products of the predetermined shape or construction such as film, sheet, fibrous materials, fabric articles, other molded parts, and laminates.

Suitable nonmetallic inorganic materials include, for example, glass, ceramics, stone and the like. These materials may be formed into products of various shapes such as tiles, glass, mirrors, wall members, and design members.

Suitable metal inorganic materials include, for example, cast iron, steel materials, iron, iron alloys, aluminum, aluminum alloys, nickel, nickel alloys, and die cast zinc. They may take the form of a plating of the metal inorganic material, or a coating of the organic material, or a plating on the surface of the organic material or nonmetallic inorganic material.

One exemplary method of forming a photocatalytic thin film on the surface of a member is by applying the anatase or rutile titanium oxide ultrafine particle dispersion onto the member surface by any of well-known coating techniques such as spray coating and dip coating, and drying by any of well-known drying techniques such as far-IR drying, IH drying and hot air drying. Although the thickness of the photocatalytic thin film may vary over a wide range, the thickness is preferably in the range of 50 nm to 10 µm.

It is noted that a binder, especially silicon compound-based binder may be added to the anatase or rutile titanium oxide ultrafine particle dispersion in a weight ratio of silicon compound to titanium oxide between 1:99 and 99:1, more preferably between 10:90 and 90:10, and even more preferably between 30:70 and 70:30, for the purpose of facilitating coating of the dispersion to the member surface and binding of ultrafine particles.

As used herein, the silicon compound-based binder refers to a colloidal dispersion, solution or emulsion of a solid or liquid silicon compound in an aqueous dispersing medium. Examples include colloidal silica; silicic acid salt solutions such as silicates; silane and siloxane hydrolyzate emulsions; silicone resin emulsions; and emulsions of copolymers of silicone resin with another resin such as silicone-acrylic resin copolymers and silicone-urethane resin copolymers.

The photocatalytic film thus formed is transparent and exerts a satisfactory photocatalytic action in the ultraviolet region as in the prior art. The member having the photocatalytic film formed thereon is effective for the member surface to exert a cleaning, deodorizing or antifungal effect because organic materials can be decomposed by the photocatalytic action of titanium oxide for thereby rendering the film surface hydrophilic.

EXAMPLES

Examples and Comparative Examples are shown below for illustrating the invention although the invention is not limited thereto. In Examples, measurements were carried out as follows.

(1) Average particle size ($D_{50}$) of titanium oxide ultrafine particles in dispersion An average particle size ($D_{50}$) of titanium oxide ultrafine particles in a dispersion was measured by a particle size distribution measurement system (trade name "Nanotrac particle size analyzer UPA-EX" by Nikkiso Co., Ltd.).

(2) Analysis of Crystal Phase

Titanium oxide ultrafine particles were analyzed for crystal phase by a powder X-ray diffraction analyzer (trade name "MultiFlex" by Rigaku Co., Ltd.)

(3) Rate of Conversion from Peroxotitanic Acid Aqueous Solution to Titanium Oxide Ultrafine Particle Dispersion A rate of conversion from a peroxotitanic acid aqueous solution to a titanium oxide ultrafine particle dispersion was determined by measuring the titanium amount in the reaction mixture by the hydrogen peroxide absorptiometric analysis. An absorbance was measured by taking a sample out of the reaction mixture, making the sample acidic with sulfuric acid, reacting the sample with hydrogen peroxide for color development, and measuring an absorbance using a UV-visible spectrophotometer (trade name "UVmini 1240" by Shimadzu Corp.).

(4) Transparency of Photocatalytic Thin Film

A haze value (%) of a glass plate as substrate was measured. Next, the dispersion was coated onto the glass plate and dried to form a photocatalytic thin film. A haze value of the thin film-bearing glass plate was measured. The difference between the haze values gave a haze value of the photocatalytic thin film. For haze measurement, a haze meter (trade name "Digital Haze Meter NDH-200" by Nippon Denshoku Industries Co., Ltd.) was used. The transparency of the photocatalytic thin film was evaluated from the haze difference according to the following criterion.

Good (symbol ○): difference≤1%
Fair (symbol Δ): +1%<difference≤3%
Poor (symbol ×): difference>+3%

(5) Acetaldehyde Gas Decomposition Test of Photocatalytic Thin Film (Under UV Exposure)

A photocatalytic thin film prepared by coating and drying the dispersion was evaluated for activity by acetaldehyde gas decomposition reaction. Evaluation was according to the flow mode gas decomposition test. Specifically, a test sample having a photocatalytic thin film formed on a glass substrate of 5 cm×10 cm was placed in a quartz glass cell with a volume of 100 cm$^3$. An acetaldehyde gas with a concentration of 100 ppm and conditioned to a humidity of 50% was flowed through the cell at a flow rate of 30 mL/s, while light was irradiated in 1 mW/cm$^2$ from a black-light lamp mounted above the cell. As acetaldehyde was decomposed with the thin film-shaped photocatalyst, the acetaldehyde concentration of the gas flowing out of the cell decreased. Thus the amount of acetaldehyde decomposed could be determined by measuring the acetaldehyde concentration. The acetaldehyde gas concentration was measured by a gas chromatograph (trade name "GC-8A" by Shimadzu Corp.).

Examples are given below for illustrating the invention. In Examples, a reactor system as described below was used.

Reactor System

A reactor system was as shown in FIG. 1. A high-pressure feed pump was connected at its suction side to a feedstock tank and at its discharge side to a stainless steel tube (serving as heating reactor) with an outer diameter of 3 mm, an inner diameter of 2 mm and a length of 50 m wound in coil form and installed in a steam heating furnace. The outlet of the heating reactor was connected to a stainless steel tube (serving as cooling section) with an outer diameter of 3 mm, an inner diameter of 2 mm and a length of 50 m installed in a water bath. The outlet of the cooling section was connected to a collector tank via a back-pressure valve so that the reaction product might be collected in the collector tank under atmospheric pressure.

Example 1

A 36 wt % titanium(IV) chloride aqueous solution was diluted with pure water by a factor of 10. Then 10 wt % aqueous ammonia was slowly added to the aqueous solution to effect neutralization and hydrolysis, whereupon titanium hydroxide precipitated out. At this point, the solution was at pH 9. The precipitate of titanium hydroxide was deionized by repeating pure water addition and decantation. To the titanium hydroxide precipitate as deionized, 30 wt % hydrogen peroxide solution was added so as to give a hydrogen peroxide/titanium hydroxide molar ratio of at least 2.5. The solution was stirred one day at room temperature to drive reaction to a full extent. Thereafter, pure water was added for concentration adjustment, yielding a yellow transparent peroxotitanic acid solution (solids concentration 1 wt %).

Suction tubes of a high-pressure feed pump (trade name "general-purpose high-pressure feed pump 8832" by AQUATH Co., Ltd.) were connected to a feedstock tank (1a) filled with 20 L of pure water and another feedstock tank (1b) filled with 20 L of peroxotitanic acid solution. First the high-pressure feed pump was operated to feed pure water from the tank (1a) to the system tube. After the tube was filled with pure water, the pressure within the tube was held at 2 MPa or higher by the back-pressure valve. The steam heating furnace was set at 190° C., whereby the pure water in the coiled tube situated in the heating furnace was heated. After it was confirmed that the temperature of pure water reached 190° C., the valves were switched over to bring the high-pressure feed pump in fluid communication with the other tank (1b) to feed the peroxotitanic acid solution to the system tube. Since the peroxotitanic acid solution thus fed underwent hydrothermal reaction at 190° C. in the heating section, it was converted to an anatase titanium oxide ultrafine particle dispersion, which was subsequently cooled to 25° C. in the cooling section to quench the reaction.

On analysis of the resulting dispersion, titanium oxide ultrafine particles therein had an average particle size of 13.7 nm, and the rate of conversion from peroxotitanic acid solution to titanium oxide particles was 99.3%.

The time of hydrothermal reaction in the heating section was 3 minutes, the time taken for heating was 20 seconds, and the time taken for cooling was 1 minute.

Comparative Example 1

Hydrothermal treatment was carried out as in Example 1 except that the heating temperature of the heating section was 130° C.

Comparative Example 2

Hydrothermal treatment was carried out in a batchwise reactor. Specifically, an autoclave with a volume of 500 mL was charged with 400 mL of a peroxotitanic acid solution obtained as in Example 1, which was subjected to hydrothermal treatment at 190° C. and 1.4 MPa for 90 minutes. Thereafter, the reaction mixture in the autoclave was discharged via a sampling tube to a vessel held in a water bath at 25° C. In this way, the reaction mixture was rapidly cooled to quench the reaction, yielding a titanium oxide ultrafine particle dispersion.

To each of the dispersions prepared in Example 1, Comparative Examples 1 and 2, a silica-based binder (colloidal silica, trade name "SNOWTEX 20" by Nissan Chemical Industries Co., Ltd.) was added to give a TiO$_2$/SiO$_2$ weight ratio of 1.5. The dispersion was coated onto a glass plate by a dip coater and dried to form a photocatalytic thin film having a thickness of 300 nm, yielding a test sample.

Table 1 tabulates the reaction conditions, average particle size, crystal phase, reactant conversion rate, transparency of photocatalytic thin film, and a gas decomposition rate in the acetaldehyde gas decomposition test after 90 minutes of black light illumination in Example 1, Comparative Examples 1 and 2.

pure water reached 190° C., the valves were switched over to bring the high-pressure feed pump in fluid communication with the other tank (1b) to feed the tin-containing peroxotitanic acid solution to the system tube. Since the tin-containing peroxotitanic acid solution thus fed underwent hydrothermal reaction at 190° C. in the heating section, it was converted to a rutile titanium oxide ultrafine particle dispersion, which was subsequently cooled to 25° C. in the cooling section to quench the reaction.

On analysis of the resulting dispersion, titanium oxide ultrafine particles therein had an average particle size of 10.5 nm, and the rate of conversion from peroxotitanic acid solution to titanium oxide particles was 98.9%.

TABLE 1

| | Reaction conditions | | Test results | | | | |
|---|---|---|---|---|---|---|---|
| | Temperature (° C.) | Time until reaction temperature (min) | Average particle size (nm) | Crystal phase | Conversion rate (%) | Thin film transparency | Gas decomposition rate (%) |
| Example 1 | 190 | 0.3 | 13.7 | Anatase | 99.3 | ◯ | 61.5 |
| Comparative Example 1 | 130 | 0.3 | 9.5 | Anatase | 13.4 | ◯ | 5.5 |
| Comparative Example 2 | 190 | 40 | 18.7 | Anatase | 99.5 | ◯ | 20.5 |

As seen from the results of Example 1 and Comparative Example 2, if the time taken until the reaction temperature is reached is short, the resultant titanium oxide ultrafine particles have a smaller particle size and improved gas decomposition capability as photocatalyst.

Example 2

A 36 wt % titanium(IV) chloride aqueous solution and tin(IV) chloride in an amount of 5 mol % relative to Ti were diluted with pure water by a factor of 10. Then 10 wt % aqueous ammonia was slowly added to the aqueous solution to effect neutralization and hydrolysis, whereupon titanium hydroxide precipitated out. At this point, the solution was at pH 9. The precipitate of titanium hydroxide was deionized by repeating pure water addition and decantation. To the titanium hydroxide precipitate as deionized, 30 wt % hydrogen peroxide solution was added so as to give a hydrogen peroxide/titanium hydroxide molar ratio of at least 2.5. The solution was stirred one day at room temperature to drive reaction to a full extent. Thereafter, pure water was added for concentration adjustment, yielding a yellow transparent tin-containing peroxotitanic acid solution (solids concentration 1 wt %).

Suction tubes of a high-pressure feed pump (trade name "general-purpose high-pressure feed pump 8832" by AQUATH Co., Ltd.) were connected to a feedstock tank (1a) filled with 20 L of pure water and another feedstock tank (1b) filled with 20 L of tin-containing peroxotitanic acid solution. First the high-pressure feed pump was operated to feed pure water from the tank (1a) to the system tube. After the tube was filled with pure water, the pressure within the tube was held at 2 MPa or higher by the back-pressure valve. The steam heating furnace was set at 190° C., whereby the pure water in the coiled tube situated in the heating furnace was heated. After it was confirmed that the temperature of The time of hydrothermal reaction in the heating section was 3 minutes, the time taken for heating was 20 seconds, and the time taken for cooling was 1 minute.

Comparative Example 3

Hydrothermal treatment was carried out as in Example 2 except that the heating temperature of the heating section was 130° C.

Comparative Example 4

Hydrothermal treatment was carried out in a batchwise reactor. Specifically, an autoclave with a volume of 500 mL was charged with 400 mL of a tin-containing peroxotitanic acid solution obtained as in Example 2, which was subjected to hydrothermal treatment at 190° C. and 1.4 MPa for 90 minutes. Thereafter, the reaction mixture in the autoclave was discharged via a sampling tube to a vessel held in a water bath at 25° C. In this way, the reaction mixture was rapidly cooled to quench the reaction, yielding a titanium oxide ultrafine particle dispersion.

To each of the dispersions prepared in Example 2, Comparative Examples 3 and 4, a silica-based binder (colloidal silica, trade name "SNOWTEX 20" by Nissan Chemical Industries Co., Ltd.) was added to give a TiO$_2$/SiO$_2$ weight ratio of 1.5. The dispersion was coated onto a glass plate by a dip coater and dried to form a photocatalytic thin film having a thickness of 300 nm, yielding a test sample.

Table 2 tabulates the reaction conditions, average particle size, crystal phase, reactant conversion rate, transparency of photocatalytic thin film, and a gas decomposition rate in the acetaldehyde gas decomposition test after 90 minutes of black light illumination in Example 2, Comparative Examples 3 and 4.

TABLE 2

| | Reaction conditions | | | Test results | | | | |
|---|---|---|---|---|---|---|---|---|
| | Temperature (° C.) | Time until reaction temperature (min) | Tin addition (mol %) | Average particle size (nm) | Crystal phase | Conversion rate (%) | Thin film transparency | Gas decomposition rate (%) |
| Example 2 | 190 | 0.3 | 5 | 10.5 | Rutile | 98.9 | ◯ | 32.5 |
| Comparative Example 3 | 130 | 0.3 | 5 | 6.5 | Rutile | 10.3 | ◯ | 3.5 |
| Comparative Example 4 | 190 | 40 | 5 | 12.5 | Rutile | 98.9 | ◯ | 24.0 |

As seen from the results of Example 2 and Comparative Example 4, if the time taken until the reaction temperature is reached is short, the resultant titanium oxide ultrafine particles have a smaller particle size and improved gas decomposition capability as photocatalyst.

INDUSTRIAL APPLICABILITY

The anatase or rutile form titanium oxide ultrafine particle dispersion according to the invention is advantageously applicable to various substrates of inorganic materials such as glass and metals and organic materials such as polymer film (typically PET film) to form a photocatalytic thin film thereon, especially a transparent photocatalytic thin film on polymer film.

The invention claimed is:

1. A method for continuously manufacturing an anatase titanium oxide ultrafine particle dispersion from a peroxotitanic acid solution, the method comprising:
providing a flow reactor comprising a first feedstock tank for containing an aqueous medium except alcohol, a second feedstock tank for containing a peroxotitanic acid solution, a high-pressure feed pump, a heating section, a cooling section, and a collector section, wherein
the first feedstock tank is connected to the high-pressure feed pump via a first pipe,
the second feedstock tank is connected to the high-pressure feed pump via a second pipe,
the high-pressure feed pump is connected at a suction side to the first and second feedstock tanks via valves, respectively, and at a discharge side to a metal tube extending to the heating section and then to the cooling section, so as to feed the aqueous medium and the peroxotitanic acid solution from the first and second feedstock tanks, respectively, to the heating section,
the heating section having a coiled metal tube which is connected to the discharge side of the high-pressure feed pump and is externally heated for subjecting the peroxotitanic acid solution flowing through a bore of the tube to hydrothermal treatment, so that the peroxotitanic acid solution is converted into an anatase titanium oxide ultrafine particle dispersion,
the cooling section having a coiled metal tube which is connected to an outlet tube of the heating section and is externally cooled so that the anatase titanium oxide dispersion flowing through a bore of the tube is cooled to stop the reaction, and a back-pressure valve is disposed at the outlet of the cooling section, and
the collector section having a collector tank which is connected to the outlet tube of the cooling section;
filling the first feedstock tank with the aqueous medium except alcohol and the second feedstock tank with the peroxotitanic acid solution, respectively;
supplying the aqueous medium from the first feedstock tank to the coiled metal tube of the heating section via the first pipe by the high-pressure feed pump and heating the aqueous medium to 150 to 250° C. in the coiled metal tube prior to supplying the peroxotitanic acid solution from the second feedstock tank to the coiled metal tube of the heating section;
stopping the supply of the aqueous medium to the coiled metal tube of the heating section; then
supplying the peroxotitanic acid solution from the second feedstock tank to the coiled metal tube of the heating section via the second pipe and heating the peroxotitanic acid solution in the coiled metal tube, so that the peroxotitanic acid solution is subjected to hydrothermal reaction at 150 to 250° C. and 0.5 to 10 MPa for 0.5 to 20 minutes to convert the peroxotitanic acid solution into the anatase titanium oxide ultrafine particle dispersion;
transferring the anatase titanium oxide ultrafine particle dispersion to the coiled metal tube of the cooling section to cool the anatase titanium oxide ultrafine particle dispersion so that the reaction is stopped, and
collecting the anatase titanium oxide ultrafine particle dispersion from the outlet tube of the collector section.

2. The method of claim 1 wherein the titanium oxide ultrafine particles in the anatase titanium oxide ultrafine particle dispersion have a 50% particle diameter ($D_{50}$) in the cumulative distribution on volume basis of up to 50 nm as measured by the dynamic scattering method using laser light.

3. The method of claim 1 or 2 wherein the peroxotitanic acid solution continuously fed to the coiled metal tube of the heating section is heated to the hydrothermal reaction temperature of 150 to 250° C. within 2 minutes.

4. The method of claim 1 wherein the titanium oxide ultrafine particle dispersion obtained from hydrothermal treatment of the peroxotitanic acid solution at the coiled metal tube of the heating section is subsequently cooled to or below 40° C. within 3 minutes at the coiled metal tube of the cooling section.

5. The method of claim 1 wherein the reaction time within 0.5 to 20 minutes in the flow reactor is further adjusted such that the peroxotitanic acid solution is converted to the titanium oxide ultrafine particle dispersion at a conversion rate of 95 to 99.5%.

6. The method of claim 1, further comprising a step of adding a binder to the resulting anatase titanium oxide ultrafine particle dispersion.

7. The method of claim 6 wherein the binder is a silicon compound binder.

8. A member having on its surface a photocatalytic thin film which is formed by applying the anatase titanium oxide ultrafine particle dispersion obtained by the method of claim 1 and drying.

9. A method for continuously manufacturing a rutile titanium oxide ultrafine particle dispersion from a tin-containing peroxotitanic acid solution, the method comprising:
providing a flow reactor comprising a first feedstock tank for containing an aqueous medium except alcohol, a second feedstock tank for containing a tin-containing peroxotitanic acid solution, a high-pressure feed pump, a heating section, a cooling section, and a collector section, wherein
the first feedstock tank is connected to the high-pressure feed pump via a first pipe,
the second feedstock tank is connected to the high-pressure feed pump via a second pipe,
the high-pressure feed pump is connected at a suction side to the first and second feedstock tanks via valves, respectively, and at a discharge side to a metal tube extending to the heating section and then to the cooling section, so as to feed the aqueous medium and the tin-containing peroxotitanic acid solution from the first and second feedstock tanks, respectively, to the heating section,
the heating section having a coiled metal tube which is connected to the discharge side of the high-pressure feed pump and is externally heated for subjecting the tin-containing peroxotitanic acid solution flowing through a bore of the tube to hydrothermal treatment, so that the tin-containing peroxotitanic acid solution is converted into an rutile titanium oxide ultrafine particle dispersion,
the cooling section having a coiled metal tube which is connected to the outlet tube of the heating section and is externally cooled so that the rutile titanium oxide dispersion flowing through a bore of the tube is cooled to stop the reaction, and a back-pressure valve is disposed at the outlet of the cooling section, and
the collector section having a collector tank which is connected to the outlet tube of the cooling section;
filling the first feedstock tank with the aqueous medium except alcohol and the second feedstock tank with the tin-containing peroxotitanic acid solution, respectively;
supplying the aqueous medium from the first feedstock tank to the coiled metal tube of the heating section via the first pipe by the high-pressure feed pump and heating the aqueous medium to 150 to 250° C. in the coiled metal tube prior to supplying the tin-containing peroxotitanic acid solution from the second feedstock tank to the coiled metal tube of the heating section;
stopping the supply of the aqueous medium to the coiled metal tube of the heating section; then
supplying the tin-containing peroxotitanic acid solution from the second feedstock tank to the coiled metal tube of the heating section via the second pipe and heating the tin-containing peroxotitanic acid solution in the coiled metal tube, so that the tin-containing peroxotitanic acid solution is subjected to hydrothermal reaction at 150 to 250° C. and 0.5 to 10 MPa for 0.5 to 20 minutes to convert the tin-containing peroxotitanic acid solution into the rutile titanium oxide ultrafine particle dispersion;
transferring the rutile titanium oxide ultrafine particle dispersion to the coiled metal tube of the cooling section to cool the rutile titanium oxide ultrafine particle dispersion so that the reaction is stopped; and
collecting the rutile titanium oxide ultrafine particle dispersion from the outlet tube of the collector section.

10. The method of claim 9 wherein the tin is contained in such an amount that a molar ratio (Ti/Sn) of titanium to tin is from 1 to 1,000.

11. The method of claim 9 or 10 wherein the titanium oxide ultrafine particles in the rutile titanium oxide ultrafine particle dispersion have a 50% particle diameter ($D_{50}$) in the cumulative distribution on volume basis of up to 50 nm as measured by the dynamic scattering method using laser light.

12. The method of claim 9 wherein the peroxotitanic acid solution continuously fed to the coiled metal tube of the heating section is heated to the hydrothermal reaction temperature of 150 to 250° C. within 2 minutes.

13. The method of claim 9 wherein the titanium oxide ultrafine particle dispersion obtained from hydrothermal treatment of the peroxotitanic acid solution at the coiled metal tube of the heating section is subsequently cooled to or below 40° C. within 3 minutes at the coiled metal tube of the cooling section.

14. The method of claim 9 wherein the reaction time within 0.5 to 20 minutes in the flow reactor is further adjusted such that the peroxotitanic acid solution is converted to the titanium oxide ultrafine particle dispersion at a conversion rate of 95 to 99.5%.

15. The method of claim 9, further comprising a step of adding a binder to the resulting rutile titanium oxide ultrafine particle dispersion.

16. The method of claim 15 wherein the binder is a silicon compound binder.

17. A member having on its surface a photocatalytic thin film which is formed by applying the rutile titanium oxide ultrafine particle dispersion obtained by the method of claim 9 and drying.

18. The method of claim 1 or 9 wherein each the coiled metal tubes at the heating and cooling sections has an inner diameter of up to 20 mm.

19. The method of claim 1 or 9 wherein each the coiled metal tubes at the heating and cooling sections is a stainless steel tube.

* * * * *